(12) United States Patent
Repperger et al.

(10) Patent No.: US 8,244,503 B1
(45) Date of Patent: Aug. 14, 2012

(54) QUANTITATIVE MEASUREMENTS OF SYSTEM COMPLEXITY

(75) Inventors: Daniel W. Repperger, Dayton, OH (US); Rodney G. Roberts, Tallahassee, FL (US); Corbin G. Koepke, Cincinnati, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 941 days.

(21) Appl. No.: 11/900,137

(22) Filed: Aug. 30, 2007

(51) Int. Cl.
*G06F 7/60* (2006.01)
*G06F 17/50* (2006.01)
*G06F 9/45* (2006.01)
*G06F 11/30* (2006.01)
*G06G 7/48* (2006.01)
*H03F 1/26* (2006.01)

(52) U.S. Cl. .................. 703/2; 703/6; 703/13; 703/22; 702/182; 702/196; 706/45

(58) Field of Classification Search .................. 703/2, 6, 703/13, 22; 702/182, 183, 186, 194, 196; 706/45
See application file for complete search history.

(56) References Cited

U.S. PATENT DOCUMENTS

| | | | |
|---|---|---|---|
| 5,485,551 A | 1/1996 | Ejima et al. | |
| 5,655,074 A * | 8/1997 | Rauscher | 714/38 |
| 5,774,357 A | 6/1998 | Hoffberg et al. | |
| 5,966,140 A * | 10/1999 | Popovic et al. | 345/441 |
| 6,000,833 A | 12/1999 | Gershenfeld et al. | |
| 6,021,403 A | 2/2000 | Horvitz et al. | |
| 6,128,773 A | 10/2000 | Snider | |
| 6,198,412 B1 * | 3/2001 | Goyal | 341/50 |
| 6,260,035 B1 | 7/2001 | Horvitz et al. | |
| 6,262,730 B1 | 7/2001 | Horvitz et al. | |
| 6,408,029 B1 | 6/2002 | McVeigh et al. | |
| 6,463,173 B1 | 10/2002 | Tretter | |
| 6,580,833 B2 | 6/2003 | Goertzen | |
| 6,651,244 B1 * | 11/2003 | Smith et al. | 717/154 |
| 6,751,536 B1 | 6/2004 | Kipersztok et al. | |
| 6,862,559 B1 | 3/2005 | Hogg | |
| 2005/0080817 A1 | 4/2005 | Janow | |

OTHER PUBLICATIONS

"Investigation of Performance of Distributed Complex Systems Using Information-theoretic Means and Genetic Algorithms", D.W. Repperger, et al. Jun. 20-23, 2007.*
"Optimal Terminal Rendezvous as a Stochastic Differential Game Problem", D.W. Repperger, et al. IEEE Transactions on Aerospace and Electronic Systems. May 1972.*
"Visualization of Uncertainty", Aleva, Denise et al. Air Force Research Laboratory. Dec. 2005.*
C. E. Shannon, "Communications in the Presence of Noise," *Proceedings of the IRE*, 37, pp. 10-22, 1949.
M. G. Helander and L. Lin, "Axiomatic design in ergonomics and an extension of the information theory axiom," *Journal of Engineering Design*, 13 (4), 2002, pp. 321-339.

(Continued)

*Primary Examiner* — Kandasamy Thangavelu
*Assistant Examiner* — Nithya Janakiraman
(74) *Attorney, Agent, or Firm* — AFMCLO/JAZ; Fredric L. Sinder

(57) ABSTRACT

A method is provided for determining the complexity of a system. The method includes creating a response matrix for the system, creating a contingency matrix, $C_n$, from the response matrix, and calculating the complexity of the system from the formula: Complexity=$[\alpha/\det(C_n{}^T C_n)]*\text{Log}_2([(H(x)/H(y))])$ wherein $H(x)$ is the input information quantity, $H(y)$ is the output information quantity, and $\alpha$ is a dimensionless system constant. The method also includes displaying the complexity of the system.

15 Claims, 8 Drawing Sheets

OTHER PUBLICATIONS

D. Mann, "Axiomatic Design and TRIZ: Compatibilities and Contradictions," *Proceeding of the ICAD 2002 Second International Conference on Axiomatic Design*, Cambridge, MA, Jun. 10-11, 2002.

E. Burke, J. M. Kloeber, and R. F. Deckro, "Using and Abusing QFT Scores," *Quality Engineering*, 15 (1), 2002, pp. 9-21.

K. M. Calhoun, et al., "Planning and re-planning in project and production scheduling," *Omega*, 30(2002), pp. 155-170.

J. Houser and D. Clausing, "The House of Quality," *Harvard Business Review*, 1988, 3 (May-June), pp. 63-83.

E. Nowicki, and C. Smutnicki, "A fast taboo search algorithm for the job shop problem," *Management Science*, 1996, 42 (6), pp. 797-813.

R. Albert and B. Albert-Laszio, "Statistical Mechanics of Complex Networks," *Reviews of Modern Physics*, Jan. 24, 2002, pp. 47-97.

J. M. Carlson and J. Doyle, "Highly Optimized Tolerance: A Mechanism for Power Laws in Designed Systems," *Physics Reviews E*, 60 (2), 1999, pp. 1412-1427.

S. Strogatz, "Exploring Complex Networks," *Nature*, 410 Mar. 8, 2001, pp. 268-276.

P. M. Fitts, "The information capacity of the human motor system in controlling the amplitude of movement," *Journal of Experimental Psychology*, 47, 1954, pp. 381-391.

* cited by examiner

QUANTITATIVE MEASUREMENTS OF SYSTEM COMPLEXITY

RIGHTS OF THE GOVERNMENT

The invention described herein may be manufactured and used by or for the Government of the United States for all governmental purposes without the payment of any royalty.

FIELD OF THE INVENTION

The present invention relates generally to measuring the complexity of systems, and more specifically, to determining the complexity of distributed systems and other networks.

BACKGROUND OF THE INVENTION

The structure of organizations and the flow of information in distributed systems are becoming more complex. Corporations, government agencies, and other organization entities usually employ large groups of people to accomplish a mission. Frequently, these employees are geographically separated but must work together to achieve common goals. As a result and with no fault of the employees, there is wasted effort expended during processes. Also, extraneous information may be injected into processes which distracts from accomplishing the mission.

To reduce wasted effort and misinformation, managers and other decision-makers seek to modify the organizational structure or the steps within a process. Also, nodes may be added to or deleted from a system to improve mission effectiveness. When changes to the system are made, it is desirable to measure the "before" and "after" effectiveness of the system.

The prior art teaches some methods for measuring the effectiveness and/or complexity of systems. For example, U.S. Pat. No. 6,128,773 to Snider discloses an inventive metric tool which estimates the entropy of the source code as a measure of the complexity of the software. The tool considers the dependency of the symbols in the software and constructs a data graph representing the structure of the program. Each symbol is shown as a node in the graph, with the dependencies shown as edges connecting the different nodes. The tool uses information theory to estimate the amount of information, or entropy, needed to describe those dependencies. The entropy provides a measure of the complexity of the program, as the greater the entropy, the more complex the dependencies, and the more complex the program.

U.S. Patent Application Publication No. 2005/0080817 to Janow teaches that the consumption of decision information by an organization's own structures results in an upper limit on the average sustainable per capita decision rate. Individual decision-makers insert management decisions into the control network and expect to eventually receive decisions back from it. The organizational entropy and the related maximum decision rate measures extra information used to support the partitioning of tasks to decision-making nodes. The invention teaches how to quantify organizational entropy, using information theory, and applies the new principles to tools for managing and re-engineering organizations in order to improve productivity in performing knowledge-intensive tasks. The embodiments are quantitative methods of choosing efficient organizational structures and sizes matched to the decision complexity. Some preferred methods are operations research (OR) optimization techniques that incorporate organizational entropy into their cost functions and also rules or heuristics for applying broad organizational re-engineering strategies that managers can use to improve performance.

Also, U.S. Pat. No. 6,862,559 to Hogg discloses a method for computing a diversity measure H(m) for combinatorial structures which involves identifying all M possible substructures having m elements from among the n elements of the combinatorial structure. The number of the substructures that are similar to each such substructure is determined, and the frequency of each distinct substructure is calculated using the number of similar substructures and the total number of substructures M. The method uses the frequency of each distinct substructure to compute an entropy corresponding to m. By the same process described above, and entropy corresponding to m+1 is computed. The entropy corresponding to m+1 is subtracted from the entropy corresponding to m to produce the diversity measure H(m). In the preferred embodiment, similar substructures are determined by being identical or isomorphic. In an alternative embodiment, a distance function is used to compute a distance between two substructures, and only if the distance is less than a predetermined threshold are the two substructures determined to be similar. In the preferred embodiment, the entropy is computed by summing the frequency of each distinct substructure multiplied by the logarithm of the frequency of each distinct substructure. In an alternative embodiment, the entropy is computed by summing the frequency of each distinct substructure by the logarithm of the quotient of the frequency divided by an expected frequency of the distinct substructure.

In non-patent literature, N. P. Suh classifies systems in terms of their complexity using Axiomatic Design theory. Other examples of work involving Axiomatic Design are applications relating to the design of an ergonomic workplace by M. G. Helander and L. Lin. Other techniques, such as the TRIZ method, are combined with Axiomatic Design and are being studied by D. Mann. In the management science field, E. Nowicki and C. Smutnicki seek to develop better algorithms to reduce complexity for operations research. Finally, in biological and other systems that occur in nature, S. Strogatz teaches that complexity is sometimes viewed as interactions of an organization with its environment.

As described above, the prior art describes a number of efforts to measure characteristics of systems. However, there exists a need for a method and apparatus for determining and displaying quantitative measures of complexity, wasted effort, and controllability of a complex or distributed system.

SUMMARY OF THE INVENTION

The present invention provides a system complexity meter which provides quantitative measurements. The method and apparatus generally incorporates concepts from information theory. The complexity meter is roughly based, in part, on a ratio composed of wasted effort divided by the inability to perform a control action. The complexity meter provides a method of evaluating if distributed systems or other complex networks have the proper flow of information from the input vector to an output vector. The use of such a complexity meter can compare one system to another to determine the efficacy of the flow of information or other important throughput variables. The distributed system to be examined may be composed of nodes that may change with time. The complexity meter discussed, herein, provides a means of evaluating the efficacy of distributed systems in a variety of complex configurations. Also, the utility of a design support tool to modify a distributed system can be quantified via this invention because the "before" and "after" states of a system can be relatively compared to see the advantages brought on by the use of the design support tool.

In accordance with one aspect of the invention, there is provided a method for determining the complexity of a system, the method includes creating a response matrix for the system, creating a contingency matrix, $C_n$, from the response matrix, and calculating the complexity of the system from the formula: Complexity=$[\alpha/\det(C_n{}^TC_n)]*\text{Log}_2$ $[(H(x)/H(y)])$ where $H(x)$ is the input information quantity, $H(y)$ is the output information quantity, and $\alpha$ is a dimensionless system constant. The method also includes displaying the complexity of the system on a computer monitor and/or printing the complexity using a computer printer.

In accordance with another aspect of the invention, a method is provided for comparing the complexity of a system in first and second configurations. The method includes creating a first response matrix for the system in the first configuration, creating a first contingency matrix, $C_n$, from the first response matrix, calculating a first complexity of the system in the first configuration from the formula: First Complexity=$[\alpha/\det(C_n{}^TC_n)]*\text{Log}_2$ $[(H(x)/H(y)])$ where $H(x)$ is the input information quantity, $H(y)$ is the output information quantity, and $\alpha$ is a dimensionless system constant. The method also includes creating a second response matrix for the system in the second configuration, creating a second contingency matrix, $C_n$, from the second response matrix, calculating a second complexity of the system in the second configuration from the formula: Second Complexity=$[\alpha/\det(C_n{}^TC_n)]*\text{Log}_2$ $([H(x)/H(y)])$ where $H(x)$ is the input information quantity, $H(y)$ is the output information quantity, and $\alpha$ is a dimensionless system constant. The method further includes displaying the first and second complexities of the system and determining if the first or second configuration of the system is less complex.

In accordance with a further aspect of the present invention, a computer software product for determining the complexity of a system is provided. The software product includes a program code portion for creating a response matrix for the system, a program code portion for creating a contingency matrix, $C_n$, from the response matrix, and a program code portion for calculating the complexity of the system from the formula: Complexity=$[\alpha/\det(C_n{}^TC_n)]*\text{Log}_2$ $([(H(x)/H(y)])$ where $H(x)$ is the input information quantity, $H(y)$ is the output information quantity, and $\alpha$ is a dimensionless system constant. The software product also includes a program code portion for displaying the complexity of the system.

In the Complexity formulas, $$H(x) = \sum_{i=1}^{n} p(x_i)\log_2(1/(p(x_i)),$$

where $p(x_i) = \Sigma x_i/\Sigma x_{ij}$; (or $$p(x_i) = x_i \Big/ \sum_{i,j} x_{ij} \text{ and } H(y) = \sum_{j=1}^{m} p(x_j)\log_2(1/(p(x_j)),$$

where $$p(x_j) = \sum x_j \Big/ \sum x_{ij} \text{ (or } p(x_j) = x_j \Big/ \sum_{ij} x_{ij}).$$

The step of creating the response matrix may include determining a number of inputs and outputs of the system and determining a frequency of each input for each output. The step of creating the contingency matrix may also include dividing each frequency by a summation of the frequencies. The dimensionless constant, $\alpha$ may be 1 or may be varied depending on the type of system being analyzed.

BRIEF DESCRIPTION OF THE DRAWINGS

Preferred features of the present invention are disclosed in the accompanying drawings, wherein similar reference characters denote similar elements throughout the several views, and wherein.

DETAILED DESCRIPTION OF THE INVENTION

Figure 1:
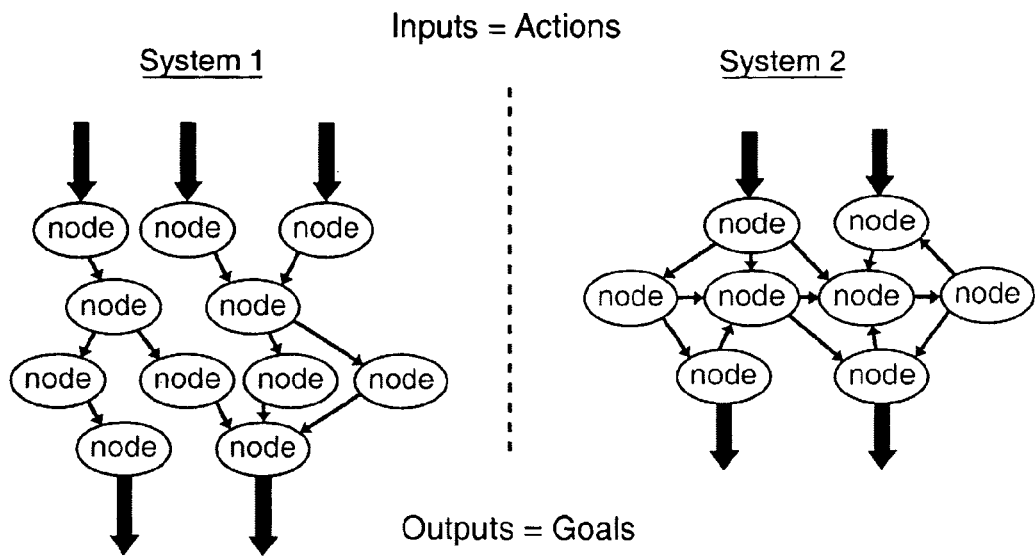
FIG. 1 is a diagram of two systems with different nodes and different flows of information.

For convenience, the same or equivalent elements in the various embodiments of the invention illustrated in the drawings have been identified with the same reference characters where applicable. Further, in the description that follows, any reference to either orientation or direction is intended primarily for the convenience of description and is not intended in any way to limit the scope of the present invention thereto. Finally, any reference to a particular application of the present invention, such as complexity of information flow through a business organization, is simply used for convenience as one example of a possible use for the invention and is not intended to limit the scope of the present invention thereto.

A method and apparatus is disclosed for calculating and displaying quantitative measures of complexity, wasted effort, and controllability of a complex or distributed system. The invention provides a method of evaluating if distributed systems or other complex networks have the proper flow of information from the input vector to an output vector. The use of such a complexity meter can compare one system to another to determine the efficacy of the flow of information or other important throughput variables.

Referring now to FIG. 1, two systems are illustrated to compare their complexity. The inputs are denoted on the top of the diagram as a flow downward of information or some other variable of interest. The outputs appear at the bottom of the diagram, and they are what the decision maker wishes to capture or what the organization is tasked to perform. At first glance, it appears that the system on the right (system 2) may be less complex than the system on the left (system 1). This is due to the fact that system 2 has less inputs, fewer nodes, and fewer layers. On closer inspection, however, in system 2, there are loops flowing in reverse directions, which may not be productive. Productivity is defined as an effective mapping from the input vector to the output vector.

Figure 2:
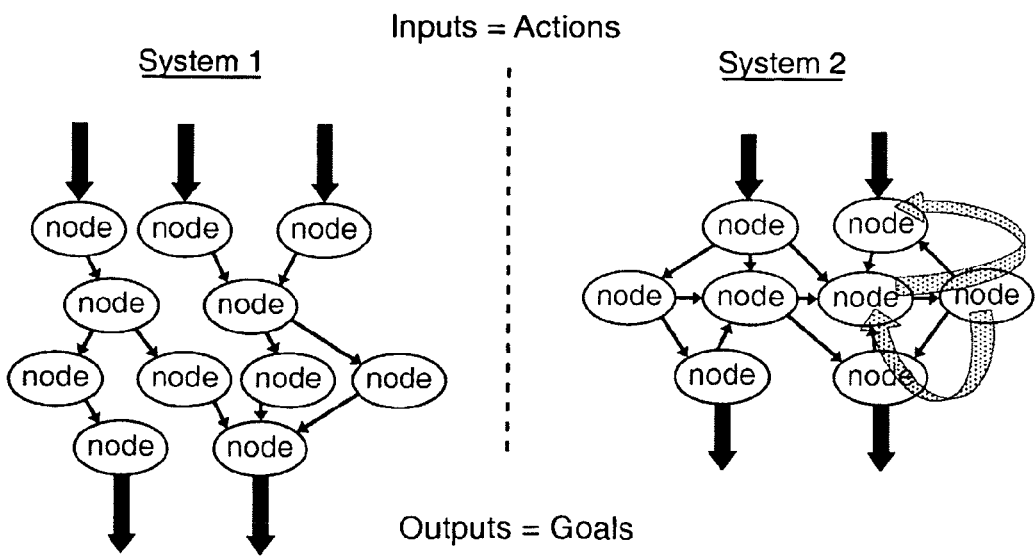
FIG. 2 illustrates the two systems of FIG. 1 but with System 2 having nonproductive loops.

In FIG. 2, the nonproductive loops are better illustrated for system 2. These nonproductive loops circulate and do not enhance the flow from the input to the output. From FIGS. 1 and 2, it may be the case that system 2 is more complex than system 1 but it is not immediately obvious. Thus, it is necessary to have a quantitative metric to better describe how easily information flows through the system. The flow of information (or other throughput variable) shown in FIG. 2 may be viewed as water flowing down a hill via the arrows. In system 2, obstacles that impede the water from getting through in an efficient manner may cause the loops as indicated. It is not all about impedance or resistance to flow. This inefficiency, caused by the non-productive loops, may be compared to complex impedances that occur in circuit theory. In an electronic circuit with an imaginary impedance (capacitor and inductors), the electrical currents sometimes circulate but do not perform actual work. They simply store energy but do not productively contribute to the output, thus reducing the overall performance in a throughput sense.

Figures 3, 4, 5:
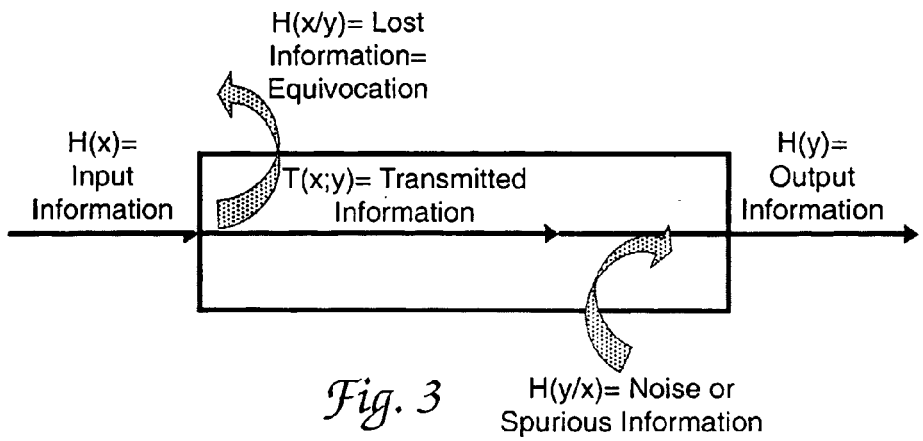
FIG. 3 shows basic elements of Information Theory.
FIG. 4 is a Response Matrix formed from collected data.
FIG. 5 is a contingency table, $C_n$, for the Response Matrix of FIG. 4.

The approach of the present invention involves basic concepts from information theory. FIG. 3 is a fundamental model from information theory. The input information for a vector symbol set $X=[x_1, x_2, \ldots, x_n]$ is denoted as $H(x)$, which is a scalar. The scalar output of the information channel is $H(y)$ for a vector Y of received symbols $Y=[y_1, y_2, y_3, \ldots, y_p]$. The information received is $H(y)$, and one goal may be to maximize this quantity. The quantities are determined as follows (where $p(.)$ indicates the probability of the occurrence of a particular symbol):

$$H(x) = \sum_{i=1}^{n} p(x_i)\log_2(1/p(x_i)) \quad (1)$$

$$H(y) = \sum_{j=1}^{p} p(y_j)\log_2(1/p(y_j)) \quad (2)$$

$$H(x, y) = \sum_{i,j}^{n,p} p(x_i, y_j)\log_2(1/p(x_i, y_j)) \quad (3)$$

The quantities are determined from the input and output symbol sets X and Y. The transmitted information is $T(x;y)$, which is commonly referred to as "mutual information."

$$T(x;y) = H(x) + H(y) - H(x,y) \quad (4)$$

$$\text{with } H(x/y) = H(x) - T(x;y) \quad (5)$$

$$\text{and } H(y/x) = H(y) - T(x;y) \quad (6)$$

More specifically, $H(x/y)$ is described as the lost information or "equivocation." This is the information that is in some sense "lost"; it never effectively gets through the system. In the discussion on the loops in system 2 of FIG. 2, this would correspond to efforts that do not directly map inputs to outputs, but much like a complex impedance, they circulate currents around and never productively contribute to the output signal. In FIG. 3, the quantity $H(y/x)$ is the "spurious information" or noise which the environment injects into the channel. It can be shown that the $H(.)$ quantities are all positive, so the term $H(y/x)$ models new information received at $H(y)$ from the environment, alone. Another way to interpret the term $H(y/x)$, is to note it is that portion of $H(y)$ completely independent of $H(x)$, but still appears in $H(y)$ as an information gain.

For the present invention, calculating the complexity of systems may be divided into two parts. Part 1 of the approach will follow from the theory of Axiomatic Design. In this approach the outputs represent the vector of goals, and the inputs represent the vector of actions. This is characterized by the following matrix equation:

$$\text{Goals}=M^*\text{Actions} \quad (7)$$

M is the Design Matrix which maps the inputs (Actions) to the outputs (Goals). There are a lot of useful procedures that can be employed with equation (7), which have been investigated in the area of Axiomatic Design. Equation (8) is one possible mapping between the goals and the actions.

$$\text{Goals} = \text{(Design Matrix)} * \text{Actions}$$

$$\begin{bmatrix} FR_{11} \\ FR_{12} \\ FR_{21} \\ FR_{22} \\ FR_{23} \\ FR_{24} \end{bmatrix} = \begin{bmatrix} A_{1111} & 0 & A_{1121} & A_{1122} & 0 & 0 \\ A_{1211} & A_{1212} & 0 & 0 & 0 & A_{1224} \\ 0 & 0 & 0 & 0 & 0 & 0 \\ 0 & 0 & 0 & A_{2222} & 0 & 0 \\ 0 & 0 & 0 & A_{2322} & 0 & 0 \\ 0 & 0 & 0 & 0 & 0 & A_{2424} \end{bmatrix} \begin{bmatrix} DP_{11} \\ DP_{12} \\ DP_{21} \\ DP_{22} \\ DP_{23} \\ DP_{24} \end{bmatrix} \quad (8)$$

In equation (8), the vernacular notation is borrowed from Axiomatic Design in that FR=functional requirements will correspond to our definition of goals. The DP terms are design processes, which are called actions and are the variables that are typically manipulated. In equation (8), there are several interesting items which will be discussed. First, the zero row in the design matrix indicates that the goal of $FR_{21}$ is not being satisfied by any action. Thus, there is a deficiency in the design matrix in the sense that we have a goal, which is not being addressed by any of the candidate actions. Also, the zero column of the design matrix indicates that the action $DP_{23}$ does not map into any of the goals. This shows the lack of utility of that action to map into any relevant goal that is desired. Thus, zero rows or columns indicate design deficiencies that need to be corrected or least dealt with.

The study in Axiomatic Design looks at this causality of mappings between inputs and outputs and identifies design deficiencies. The manner of correcting the design matrix would be to modify the present sets of goals and actions until a proper causal mapping occurs. One could use as a criterion that the rank of the design matrix must be at least as great as the number of independent goals that need to be satisfied. The reason the rank condition on the design matrix is a necessary condition is because if it is violated, there is not a proper mapping (infinite complexity) between inputs and outputs, and adjustments must be made in the goals and actions before complexity can be calculated. The early work in Axiomatic Design dealt mainly with the modifications of the actions and goals such that effective mappings would occur between the desired inputs (actions) and outputs (goals).

If a system initially has a mapping with either zero rows or columns, adjustments have to be made (remove actions or goals), so that a reduced form of the equation results with no zero rows or zero columns. When that task is accomplished, then the complexity can be calculated.

In Part 1, the rank of the design matrix (or its reduced order form) is n which is equal to or greater than the number of independent goals that need to be satisfied. Now, in Part 2, the complexity of the system may be calculated. Part 2 generally includes four steps.

Step 1—develop a response matrix from data in the field.
Step 2—from the response matrix, calculate $C_n$=contingency table.
Step 3—calculate H(x) and H(y) from the contingency table $C_n$.
Step 4—calculate complexity of the system by the formula:

$$\text{Complexity}=[\alpha/\det(C_n^T C_n)]*\text{Log}_2([(H(x)/H(y)]) \quad (9)$$

The term α is a dimensionless constant to be adjusted for a particular application. It should be noted that in equation (9), the complexity is in the form of a ratio of dimensionless variables. The terms H(x) and H(y) are positive and have units of bits. For the matrix $C_n$, it will be shown later that it is also dimensionless. Also, note that if H(x)=H(y), then the complexity can be shown to be zero, which corresponds to similar results in Axiomatic Design theory. One could crudely rewrite equation (9) in the form:

$$\text{Complexity}=(\text{wasted effort})/(\text{lack of control to make an action}) \quad (10)$$

The term $\det(C_n^T C_n)$ relates to the ability to make a control action. If the determinant of $C_n^T C_n$ becomes near zero or singular, this implies a lack of control action (catch 22 situation). This can be viewed, e.g., physically, that as action A is instituted, it impacts several goals simultaneously. To correct the results of action A, action B influences the previous set of goals in the reverse direction. Thus, action A has to be repeated again. Hence, no work can be accomplished because the goals and actions are constantly reset, but certain goals cannot be controlled independently. This is analogous to the electrical circuit or network system discussed in FIG. 2 in system 2, where currents constantly loop and do not perform any active work in the output.

Also, equation (10) has other interpretations. Suppose the wasted effort was only 10 percent of the total, but the lack of control was so small, it made the complexity severely high. This makes physical sense because it would be extremely difficult to perform a task with a relatively small wasted effort; however, the task would be accomplished with very little control over the situation.

It should be noted that the calculations needed to derive the complexity of a system as provided in equation (9) may be performed by a person with ordinary skill in the art. The calculations may be performed manually and/or with a microprocessor. For example, a computer software program, which includes code to execute the calculation herein, may be loaded onto a computer. The computer may generate the complexity of a system and display the complexity on a monitor and/or computer printout. Also, a microprocessor in a PDA or other similar handheld device may be utilized to perform the methods of the present invention.

With the formula for calculating complexity introduced, a simple example is now illustrated. In this example, as shown in FIG. 4, there are 3 goals and 3 actions. The response matrix is the first step in the calculation of system complexity in Part 2 as mentioned previously. For the response matrix, the goals become the columns, and the actions become the rows. Starting to the far left, a user in the field is asked, "In order to complete goal 1, how many times must action 1 be performed?" In this case the response is "6 times." The number "6" is entered into the top left hand corner cell of FIG. 4. Proceeding down the column, the next question asked is, "In order to complete goal 1, how many times must action 2 be performed?" In this case the response is "4." Using the same procedure, column 1 is filled in and completed.

Moving to the right one column, the process is repeated with goal 2. For example, the question is asked, "In order to perform goal 2, how many times must action 1 be performed?" As seen in the response table, the answer is "zero." The next question is, "In order to complete goal 2, how many times must action 2 be performed?" The response is "5." The process is repeated until the response matrix is filled up with all the actions recorded for all the possible goals. It is noted that there may be a non-integer term in the response matrix. For example the third column and second row in FIG. 4, the term 1.5 may be viewed as to mean that to accomplish goal 3 that, on average, it takes 3 actions for two occurrences of this goal. The next step is the calculation of the contingency table $C_n$ from the response matrix in FIG. 4.

FIG. 5 illustrates the contingency table $C_n$ for the response matrix given in FIG. 4. In FIG. 5, the number 22.5 is the total number of actions in FIG. 4 (sum of all the elements in the table) to complete the desired mission. Thus, the matrix $C_n$ is simply the response matrix in FIG. 4 divided by the sum of all the actions and has the same rank as the response matrix. The sums across the rows in FIG. 5 are calculated as indicated to the right of the table. In addition, the sums down the columns are also determined. From information theory and communications theory, the next step is to determine the terms H(x) and H(y) from FIG. 5.

To determine H(x) the formula is given as follows (for $p(x_i) \neq 0$):

$$H(x) = \sum_{i=1}^{n} p(x_i)\log_2(1/(p(x_i))) \quad (11)$$

From FIG. 4, the $p(x_i)$ terms appear on the right side of the table. Thus, $$H(x)=(6/22.5)*\log_2(1/(6/22.5))+(10.5/22.5)*(\log_2(1/(10.5/22.5))+(6/22.5)*(\log_2(1/(6/22.5))=1.5301 \text{ bits} \quad (12)$$

Now for H(y), the formula is given as follows (for $p(x_j) \neq 0$) below the table:

$$H(y) = \sum_{j=1}^{m} p(x_j)\log_2(1/(p(x_j))) \quad (13)$$

For the calculation of H(y), the column sums below the table are used:

$$H(y)=(12/22.5)*\log_2(1/(12/22.5))+(8/22.5)*(\log_2(1/(8/22.5))+(2.5/22.5)*(\log_2(1/(2.5/22.5))=1.3663 \text{ bits} \quad (14)$$

Accordingly, H(x)=1.5301 bits is the input information, and H(y)=1.3663 bits is the received information at the output of the information channel. For the remaining important variables, it is essential to compute T(x;y), H(x/y), and H(y/x) to better understand how the input information was converted to output information. These variables are illustrated via the following calculations. First, H(x,y) needs to be defined:

$$H(x, y) = \sum_{i,j}^{n,p} p(x_i, y_j)\log_2(1/p(x_i, y_j)) \quad (15)$$

From FIG. 5, the $p(x_i,y_j)$ terms include every element in the table:

$H(x,y)=(6/22.5)*\log_2(1/(6/22.5))+(4/22.5)*(\log_2(1/(4/22.5))+(5/22.5)*\log_2(1/(5/22.5))+(1.5/22.5)*(\log_2(1/(1.5/22.5))+(2/22.5)*(\log_2(1/(2/22.5))+(3/22.5)*(\log_2(1/(3/22.5))+(1/22.5)*(\log_2(1/(1/22.5))=2.5918$ bits (16)

The remaining calculations are prefunctionary as described in equations (4-6) as follows:

$T(x;y)=H(x)+H(y)-H(x,y)$ (17)

$T(x;y)=1.5301+1.3663-2.5918=0.3047$ bits (18)

then $H(x/y)=H(x)-T(x;y)$ (19)

$H(x/y)=1.5301-0.3047=1.2254$ bits (20)

also $H(y/x)=H(y)-T(x;y)$ (21)

thus $H(y/x)=1.3663-0.3047=1.0617$ bits (22)

For the complexity calculation, it is also required to have available the determinant of $[C_n{}^T C_n]$ which can be determined via $\det[C_n{}^T C_n]=6.94\times 10^{-8}$. As mentioned previously, the elements of $C_n$ are dimensionless since they have all been divided by a constant (the sum of all the elements) consisting of the same units of the other elements that appear in the original response matrix. Finally, the calculation of complexity proceeds as follows (assume $\alpha=1$):

Complexity$=[\alpha/\det(C_n{}^T C_n)]*\text{Log}_2([H(x)/H(y)])$ (23)

Complexity$=[1/(6.94\times 10^{-8})]*\text{Log}_2([1.5301/1.3663])=2.3549\times 10^6$ (24)

Note that complexity has no units since it contains only dimensionless variables. Also, a logarithm on the wasted effort term ($[H(x)/H(y)]$) is taken, but a logarithm of the controllability term $[\alpha/\det(C_n{}^T C_n)]$ is not, even though it is large. The rationale for this choice is for the metric to satisfy key classic examples from information theory. The results of the first example are summarized in Table 1.

TABLE 1

Results of Example

| H(x) | H(y) | H(x, y) | T(x; y) |
|---|---|---|---|
| 1.5301 | 1.3663 | 2.5918 | 0.3047 |

| H(x/y) | H(y/x) | det($C_n{}^T C_n$) | Complexity |
|---|---|---|---|
| 1.2254 | 1.0617 | $6.94 \times 10^{-8}$ | $2.3549 \times 10^6$ |

Next, some classical examples from information theory are illustrated to show that the metric of the present invention is valid for a number of well understood systems from the communication sciences and Axiom Design theory.

In the examples, the four systems selected are denoted as system A, system B, system C, and system D. Their response matrices are as follows:

$$A = \begin{bmatrix} 4, & 0, & 0 \\ 0, & 1, & 0 \\ 0, & 0, & 1 \end{bmatrix} \quad B = \begin{bmatrix} 0, & 3, & 0, & 0 \\ 0, & 0, & 3, & 0 \\ 0, & 0, & 0, & 3 \\ 3, & 0, & 0, & 0 \end{bmatrix}$$

$$C = \begin{bmatrix} 6, & 0, & 0 \\ 4, & 5, & 0 \\ 2, & 3, & 1 \end{bmatrix} \quad D = \begin{bmatrix} 6, & 0, & 0 \\ 4, & 5, & 0 \\ 2, & 3, & 1 \end{bmatrix}$$

The results of the complexity calculations are computed and displayed in the Table 2 with the simplifying assumption that $\alpha=1$.

TABLE 2

Results for Four Classic Examples

| System | H(x) | H(y) | H(x, y) | T(x; y) |
|---|---|---|---|---|
| A | 1.252 | 1.252 | 1.252 | 1.252 |
| B | 2.0 | 2.0 | 2.0 | 2.0 |
| C | 1.557 | 1.201 | 2.398 | 0.359 |
| D | 1.530 | 1.366 | 2.592 | 0.305 |

| System | H(x/y) | H(y/x) | det($C_n{}^T C_n$) | Complexity |
|---|---|---|---|---|
| A | 0.0 | 0.0 | $3.43 \times 10^{-4}$ | 0.0 |
| B | 0.0 | 0.0 | $1.53 \times 10^{-5}$ | 0.0 |
| C | 1.197 | 0.842 | $1.049 \times 10^{-5}$ | 35,671 |
| D | 1.225 | 1.062 | $6.94 \times 10^{-8}$ | $2.35 \times 10^6$ |

Referring to Table 2, systems A-D represent response matrices obtained from data collection in the field. System A is a simple diagonal matrix. This means there is a one to one mapping from each goal to each action. This represents zero complexity. Simple examples like this are discussed in Axiomatic Design theory. System A is also considered an example of parallel processing. This means the goals can be achieved in any order. From Table 2, (H(x)=H(y)) indicating zero complexity, as expected.

System B also has a zero complexity matrix, but it is of $4^{th}$ order as compared to system A which is only $3^{rd}$ order. The reason why B has zero complexity is because there is still only one mapping between each goal and action. In this case, action 3 satisfies goal 2 but everything is only one to one. From Table 2, again (H(x)=H(y)), and the complexity is still zero. It is noted, however, that the terms det$|C_n{}^T C_n|$ is much lower for system B as compared to system A. This is because system B is fourth order as compared to third order for system A. $C_n$ is a normalized matrix (each element of the response matrix is divided by the sum of all the elements of the response matrix). Thus, higher dimensional systems tend to give rise to more complexity due to the reduction of the det$|C_n{}^T C_n|$ term. Note system B still is of the parallel processing type.

System C is a triangular matrix. This no longer represents parallel processing; rather this is an example of serial or sequential processing because certain goals must be performed first before the latter goals can be accomplished. In Table 2, H(x)≠H(y) by 0.3558 units. This helps gives rise to a complexity value of 35,671>0.

System D is a small variant on system C and shows how complexity is affected by the sensitivity of the response matrix to become nearly singular. In system D, the third column is almost 3 times the second column. This close linear dependence between these columns is akin to a "catch 22" situation previously discussed. This means that when action 2 is applied, it affects goals 1, 2, and 3. To correct the effect of action 2 on goal 3, action 3 is applied to fix up goal 3, but it has a negative effect on goal 2. Then, goal 2 has to be revisited to try to readjust action 2 to fix up goal 2. By doing this, goal 3 is compromised, which requires a revisit to action 3, and the process will repeat. If the columns of system D were perfectly linearly dependent (one was a scalar multiple of the other), the "catch 22" condition would repeat indefinitely, and there would be infinite complexity. It is seen by comparing system D to system C that complexity must depend on the equivocation (lost information or wasted effort as measured by the ratio [H(x)/H(y)]), but also, must depend on the inability to make an effective control action (the $det|C_n^T C_n|$ term) because actions must be modified to affect all goals. Note, the "catch 22" condition is analogous to the non-productive loops seen earlier in system 2 of FIG. 2.

In equation (23) a dimensionless term $\alpha$ was inserted for some possible scaling application. In the examples previously discussed, the presumption was made that $\alpha=1$, for simplicity. The value of $\alpha$ does not affect the zero complexity examples. For other applications, however, the value of $\alpha$ may be conveniently reset when comparing two systems of non-zero complexity. One of the examples may represent a baseline example, and the $\alpha$ term allows the user to set the complexity for the baseline example to a convenient number. The other examples being judged by the baseline system can be compared, accordingly.

Figure 6:
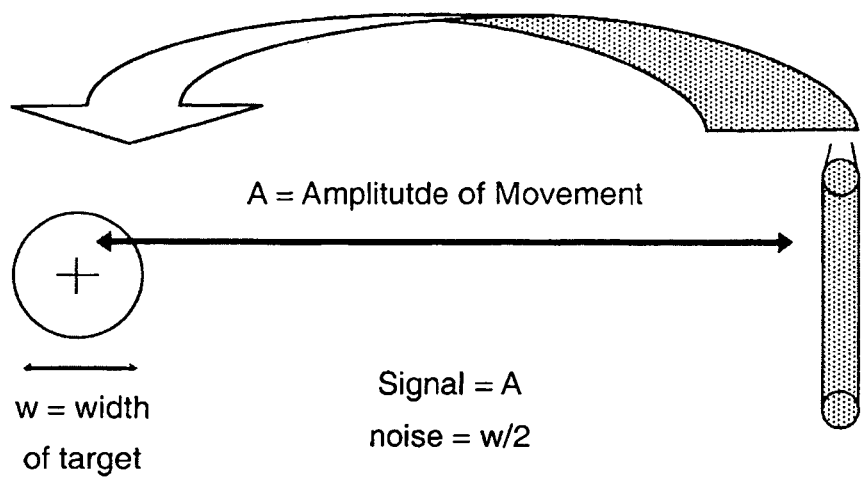
FIG. 6 illustrates Fitts' Law for reciprocal tapping.
Figure 7:
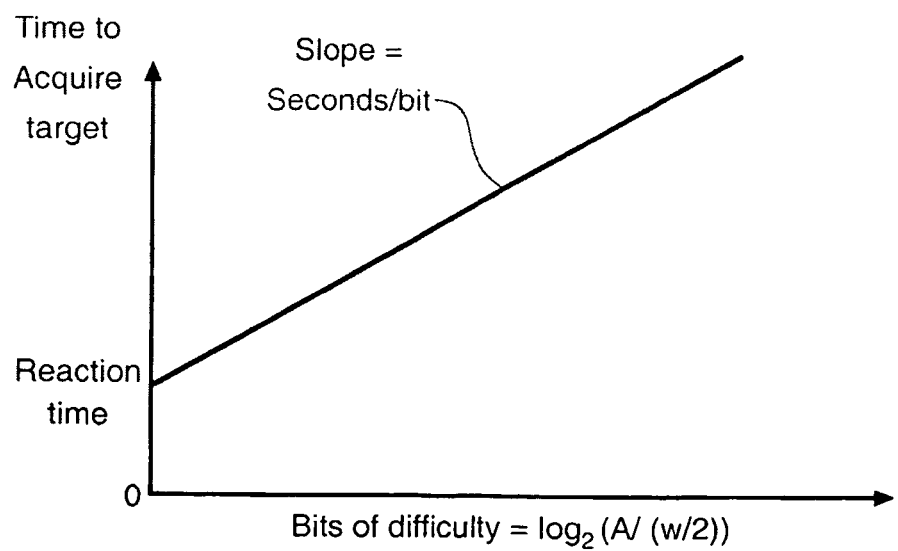
FIG. 7 shows data plotted for Fitts' Law for reciprocal tapping.

The present invention may be further described with reference Fitts' Law, an information theory model of human manual control for tracking. The complexity measurements developed herein have some similarities to Fitts' Law. In FIG. 6, Fitts' Law is illustrated for a simple reciprocal tapping task. The subject moves a pencil an amplitude distance of A units (as quickly as possible) and has to tap inside a circle of diameter w. FIG. 7 shows the performance (time to acquire the target) versus bits (defined as $\log_2(A/(w/2))$. The bits refer to the level of difficulty, which may be analogous to system complexity as described herein. In FIG. 7, the slope of the line (Fitts' Law curve) has units of seconds/bit. The reciprocal slope of this line has units of bits/second which is identical to the capacity measure used in an information theory channel. This is the calculated information capacity of the human operator. Referring back to FIG. 6, the signal can be viewed as the amplitude A, and the noise can be viewed as the slop or freedom in keeping the pencil within the circle (which is w/2). Thus, the signal to noise ratio can be written in the form of:

$$\text{Signal to noise ratio}=(\text{signal})/(\text{noise})=(A)/(w/2)=S/N \quad (25)$$

Therefore, Fitts' Law deals with $\log_2((\text{signal})/(\text{noise}))$ ratio, which is very similar to information channels. In FIG. 7, the capacity is the inverse slope of the straight line which gives rise to the rule: capacity is proportional to $1/\text{slope}=1/(\text{seconds}/\log_2(\text{signal}/\text{noise}))$. Alternatively, capacity is proportional to bits/second or $[\log_2(\text{signal}/\text{noise})]/\text{second}$. This is called baud rate in communications systems.

The following formula describes an information channel's capacity in terms of its signal to noise ratio.

$$\text{Information Channel Capacity}=(\text{Bandwidth})*\text{Log}(1+S/N) \quad (26)$$

Accordingly, the information channel's capacity measure (bits/second) or baud rate is approximately proportional to the log(S/N) term for both the information channel and Fitts' Law.

As previously provided, the complexity measure can be written:

$$\text{Complexity}=[\alpha/\det(C_n^T C_n)]*\text{Log}_2[(H(x)/H(y)]) \quad (27)$$

In Fitts' Law, the term $C_n$ is a constant (the hand is attached to the arm) and can be viewed as a constant, for example, 1. Also H(x) is analogous to the input signal S, and H(y) has analogy to the S+N received at the output. Thus, $$\text{Complexity}=\log_2[\text{signal}/(\text{signal}+\text{noise})] \quad (28)$$

Comparing equation (28) to the capacity measures from Fitts' Law, it is seen than an inverse relationship exists. That is, high capacity is related to low complexity by the following relationships (assume a base 2 logarithm):

Information channel capacity is proportional to log [(S+N)/N] or:

$$2^{Capacity}=\text{constant}*[(S+N)/N] \quad (29)$$

Complexity is proportional to log(H(x)/H(y)) or log(S/(S+N)), thus $$2^{Complexity}=\text{constant}*[S/(S+N)] \quad (30)$$

Therefore, low complexity (high S+N and high S means N is low) is related to high capacity. For high complexity (low S+N and low S means high N), the capacity is low. These variables are inversely related. High complexity gives rise to low capacity and vice versa.

Figure 8:
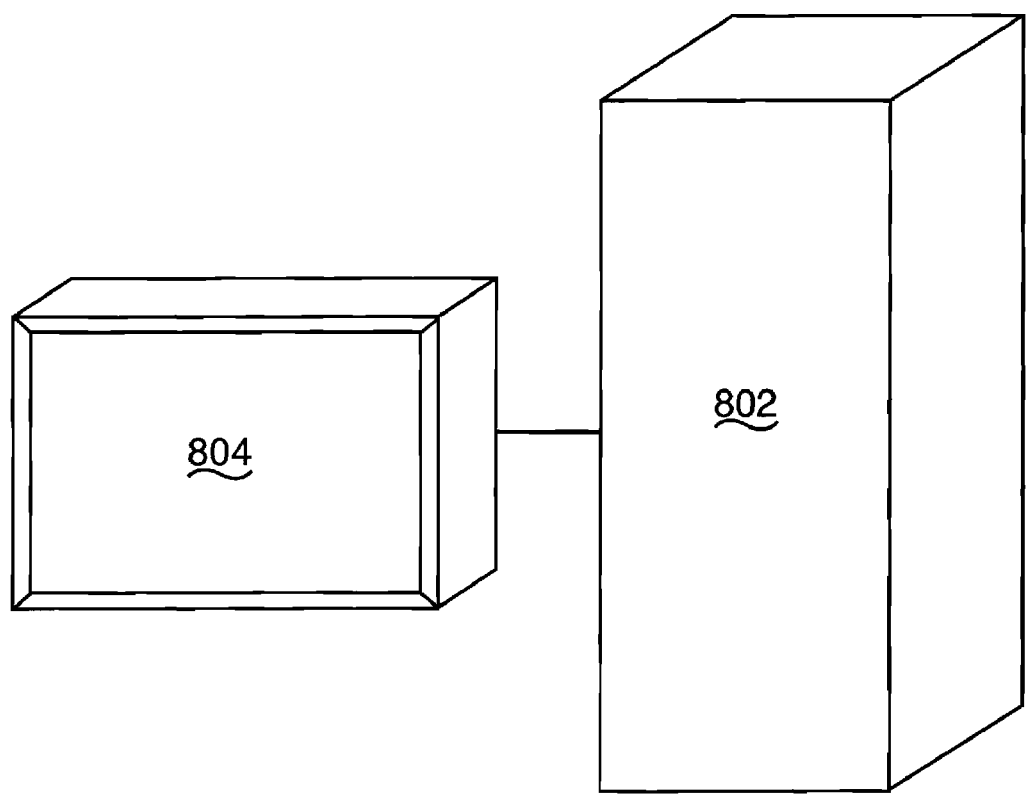
FIG. 8 shows a computer and display for implementing one example embodiment of the invention.

FIG. 8 shows a computer 802 and display 804 for implementing one example embodiment of the invention. In this example embodiment, the teachings of the present invention are applied by programming a general purpose computer to calculate system complexities according to the teachings of the present invention.

Figure 9:
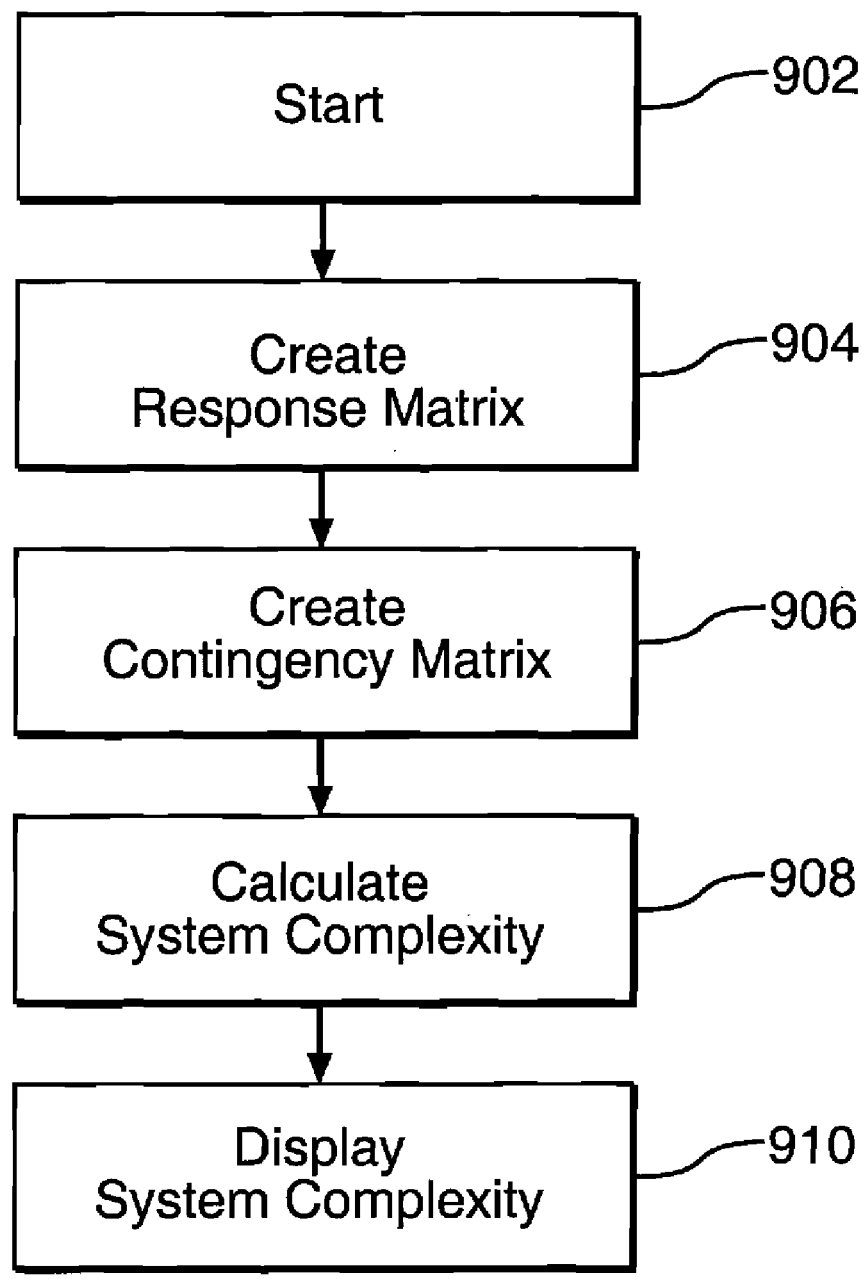
FIG. 9 shows a simple flow chart illustrating part of one example embodiment of the invention.

FIG. 9 shows a simple flow chart illustrating part of one example embodiment of the invention as might, for example, be implemented in computer 802. A response matrix is created in 904. A contingency matrix is created in 906. The system complexity is calculated in 908 and displayed in 910.

Figure 10:
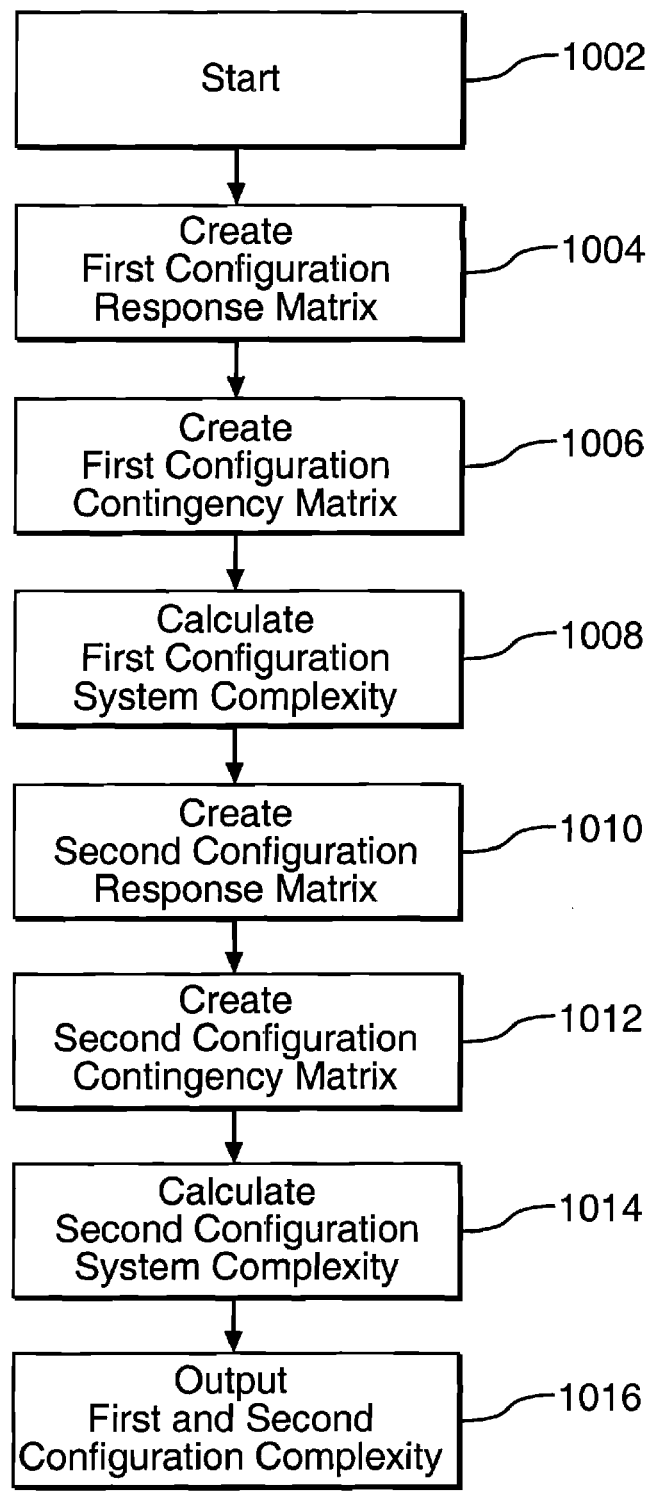
FIG. 10 shows another simple flow chart illustrating part of another example embodiment of the invention.

FIG. 10 shows another simple flow chart illustrating part of another example embodiment of the invention in which a first system configuration is compared to a second system configuration. A response matrix and a contingency matrix are calculated for the first configuration in 1004 and 1008, and a resulting first configuration system complexity calculated in 1008. Similarly, a response matrix and a contingency matrix are calculated for the second configuration in 1010 and 1012, and a resulting second configuration system complexity calculated in 1014, followed by outputting for comparison the first and second configuration complexities in 1016.

Figure 11:
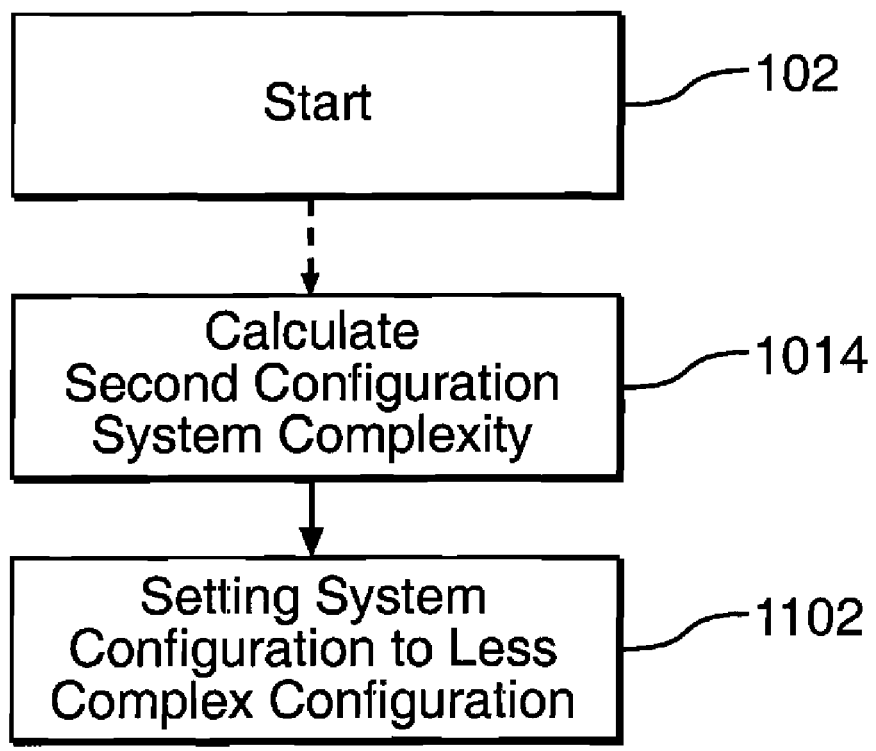
FIG. 11 shows an addition to the flow chart of FIG. 10 illustrating a variation to the example embodiment of FIG. 10.

FIG. 11 shows an addition to the flow chart of FIG. 10 illustrating a variation to the example embodiment of FIG. 10, where the system configuration is set to the less complex system configuration determined from the example embodiment of FIG. 10.

Figure 12:
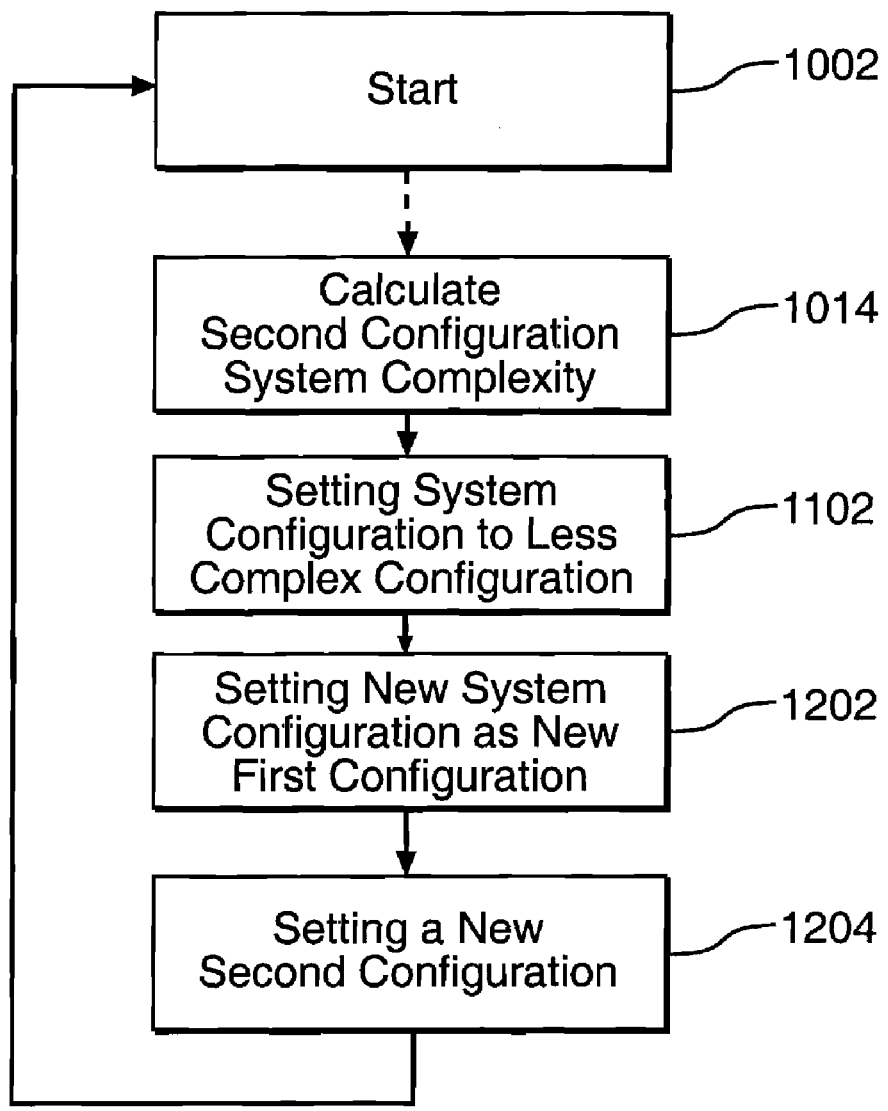
FIG. 12 shows a different addition to the flow chart of FIG. 10 illustrating a variation to the example embodiment of FIG. 11.

FIG. 12 shows a different addition to the flow chart of FIG. 10 illustrating a variation to the example embodiment of FIG. 11, where the new system configuration is set as a new first configuration in 1202, a new second configuration is set in 1204 and the example embodiment of FIG. 10 is repeated to compare the new first and second system configurations.

While various descriptions of the present invention are described above, it should be understood that the various features can be used singularly or in any combination thereof. Therefore, this invention is not to be limited to only the specifically preferred embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. An apparatus for measuring a complexity of a system, the apparatus comprising a computer programmed to:
   create a response matrix for the system;
   create a contingency matrix, $C_n$, from the response matrix;
   calculate the complexity of the system from a formula:

Complexity=$[\alpha/\det(C_n^T C_n)]*\mathrm{Log}_2([(H(x)/H(y)])$ wherein
   $H(x)$ is an input information quantity
   $H(y)$ is an output information quantity
   $\alpha$ is a dimensionless system constant; and,
   display the complexity of the system.

2. The apparatus of claim 1, wherein:

$$H(x) = \sum_{i=1}^{n} p(x_i)\log_2(1/p(x_i)), \quad \text{where } p(x_i) = \sum x_i / \sum x_{ij}$$

$$H(y) = \sum_{j=1}^{m} p(x_j)\log_2(1/p(x_j)), \quad \text{where } p(x_j) = \sum x_j / \sum x_{ij}.$$

3. The apparatus of claim 2, wherein creating the response matrix includes determining a number of inputs and outputs of the system and determining a frequency of each input for each output.

4. The apparatus of claim 3, wherein creating the contingency matrix includes dividing each frequency by a summation of the frequencies.

5. The apparatus of claim 2, wherein $\alpha=1$.

6. An apparatus for comparing a complexity of a system in first and second configurations, the apparatus comprising a computer programmed to:
   create a first response matrix for the system in the first configuration;
   create a first contingency matrix, $C_n$, from the first response matrix;
   calculate a first complexity of the system in the first configuration from a formula:

First Complexity=$[\alpha/\det(C_n^T C_n)]*\mathrm{Log}_2([(H(x)/H(y)])$ wherein
   $H(x)$ is an input information quantity
   $H(y)$ is an output information quantity
   $\alpha$ is a dimensionless system constant;
   create a second response matrix for the system in the second configuration;
   create a second contingency matrix, $C_n$, from the second response matrix;
   calculate a second complexity of the system in the second configuration from a formula:

Second Complexity=$[\alpha/\det(C_n^T C_n)]*\mathrm{Log}_2([(H(x)/H(y)])$ wherein
   $H(x)$ is an input information quantity
   $H(y)$ is an output information quantity
   $\alpha$ is a dimensionless system constant; and,
   output the first and second complexities of the system.

7. The apparatus of claim 6, wherein for the first and second complexities:

$$H(x) = \sum_{i=1}^{n} p(x_i)\log_2(1/(p(x_i))),$$

where $p(x_i)=\Sigma x_i/\Sigma x_{ij}$, using data from the first and second response matrices, respectively; and, $$H(y) = \sum_{j=1}^{m} p(x_j)\log_2(1/(p(x_j))),$$

where $p(x_j)=\Sigma x_j/\Sigma x_{ij}$, using data from the first and second response matrices, respectively.

8. The apparatus of claim 7, wherein creating the first response matrix includes determining a number of inputs and outputs of the system in the first configuration and determining a frequency of each input for each output.

9. The apparatus of claim 8, wherein creating the first contingency matrix includes dividing each frequency by a summation of the frequencies.

10. The apparatus of claim 7, wherein $\alpha=1$.

11. A process for measuring a complexity of a system, comprising; using a computer programmed to perform the following steps:
    creating a response matrix for the system;
    creating a contingency matrix, $C_n$, from the response matrix;
    calculating the complexity of the system from a formula:

Complexity=$[\alpha/\det(C_n^T C_n)]*\mathrm{Log}_2([(H(x)/H(y)])$, wherein:
    $H(x)$ is an input information quantity;
    $H(y)$ is an output information quantity; and,
    $\alpha$ is a dimensionless system constant; and,
    outputting the measured system complexity.

12. The process for measuring a complexity of a system of claim 11, wherein:

$$H(x) = \sum_{i=1}^{n} p(x_i)\log_2(1/(p(x_i))),$$

where $p(x_i)=\Sigma x_i/\Sigma x_{ij}$; and, $$H(y) = \sum_{j=1}^{m} p(x_j)\log_2(1/(p(x_j))).$$

13. The process for measuring a complexity of a system of claim 12, wherein creating the response matrix includes determining a number of inputs and outputs of the system and determining a frequency of each input for each output.

14. The process for measuring a complexity of a system of claim 13, wherein creating the contingency matrix includes dividing each frequency by a summation of the frequencies.

15. The process for measuring a complexity of a system of claim 12, wherein $\alpha=1$.

* * * * *